United States Patent
Nakamura et al.

(10) Patent No.: US 10,066,716 B2
(45) Date of Patent: Sep. 4, 2018

(54) SCREW DEVICE

(71) Applicant: THK CO., LTD., Tokyo (JP)

(72) Inventors: Futoshi Nakamura, Tokyo (JP); Tetsuhiro Nishide, Tokyo (JP); Yuji Kubota, Tokyo (JP); Tsutomu Togashi, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 15/540,445

(22) PCT Filed: Jan. 27, 2016

(86) PCT No.: PCT/JP2016/052237
§ 371 (c)(1),
(2) Date: Jun. 28, 2017

(87) PCT Pub. No.: WO2016/121781
PCT Pub. Date: Aug. 4, 2016

(65) Prior Publication Data
US 2017/0370454 A1 Dec. 28, 2017

(30) Foreign Application Priority Data

Jan. 28, 2015 (JP) .................................. 2015-014001
Jan. 27, 2016 (JP) .................................. 2016-012901

(51) Int. Cl.
*F16H 25/22* (2006.01)
*F16H 25/24* (2006.01)

(52) U.S. Cl.
CPC ......... *F16H 25/2219* (2013.01); *F16H 25/24* (2013.01)

(58) Field of Classification Search
CPC combination set(s) only.
See application file for complete search history.

(56) References Cited

U.S. PATENT DOCUMENTS

| 6,176,149 B1* | 1/2001 | Misu ................... F16C 33/3706 |
| | | 384/45 |
| 2004/0000208 A1* | 1/2004 | Michioka ............ F16C 29/0609 |
| | | 74/424.86 |

(Continued)

FOREIGN PATENT DOCUMENTS

| EP | 2 136 105 | 12/2009 |
| JP | 2003-269565 | 9/2003 |

(Continued)

OTHER PUBLICATIONS

International Search Report, PCT/JP2016/052237, dated Apr. 19, 2016.
Decision of Refusal dated Jan. 17, 2017.

*Primary Examiner* — Terence Boes
(74) *Attorney, Agent, or Firm* — Young & Thompson

(57) ABSTRACT

A disclosed screw device provides an allowance for the accuracy of a recess in an end surface of a nut. A nut has a communicating hole communicating in an axial direction, and is provided at an axial end surface of the nut with a recess communicating with the communicating hole. A circulation member including a turn-around path is placed in the recess. When the circulation member is placed in the recess, the turn-around path of the circulation member is linked to a loaded rolling element rolling groove and the communicating hole of the nut to form a circulation path of a rolling element. A clearance between the circulation member and a wall surface of the recess permits the circulation member to move. The circulation member placed in the recess is not fixed in the recess, and is covered with a lid member to be attached to the nut.

7 Claims, 12 Drawing Sheets

(56) References Cited

U.S. PATENT DOCUMENTS

| | | | |
|---|---|---|---|
| 2008/0302197 A1* | 12/2008 | Liu | F16H 25/2219 |
| | | | 74/424.82 |
| 2009/0249911 A1 | 10/2009 | Michioka et al. | |
| 2010/0064836 A1* | 3/2010 | Wu | F16H 25/2219 |
| | | | 74/424.86 |
| 2010/0236345 A1 | 9/2010 | Miyahara et al. | |
| 2014/0352472 A1* | 12/2014 | Hsieh | F16H 25/2219 |
| | | | 74/424.87 |

FOREIGN PATENT DOCUMENTS

| | | |
|---|---|---|
| JP | 2007-040469 | 2/2007 |
| JP | 2007-247778 | 9/2007 |
| JP | 2010-001970 | 1/2010 |
| WO | WO 2006/046636 | 5/2006 |
| WO | WO 2006/112212 | 10/2006 |
| WO | WO 2009/057424 | 5/2009 |

\* cited by examiner

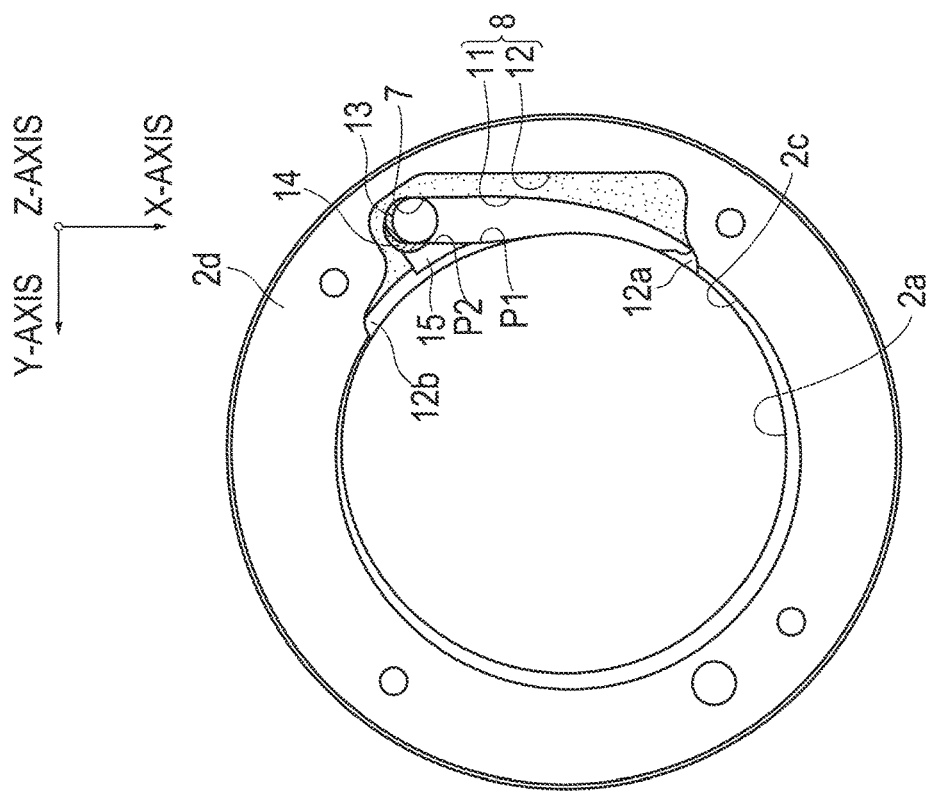
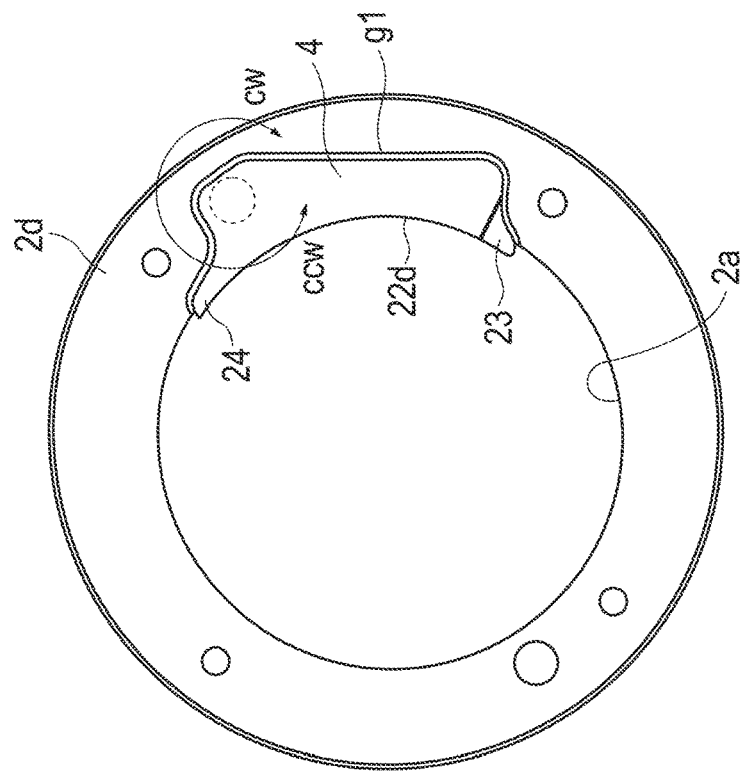

ENLARGED VIEW OF PART A

ENLARGED VIEW OF PART B

SCREW DEVICE

TECHNICAL FIELD

The present invention relates to a screw device in which rolling elements are placed between a screw shaft and a nut to circulate the rolling elements.

BACKGROUND ART

A screw device in which rolling elements are placed between a screw shaft and a nut is used as a mechanical element that converts the rotational motion of the screw shaft into the linear motion of the nut, or converts the linear motion of the screw shaft into the rotational motion of the nut. The screw device uses the rolling motion of the rolling element and accordingly has a feature that the light movement of the screw shaft and the nut can be obtained.

A what is called end piece screw device in which a circulation member is attached to each of axial end surfaces of the nut to circulate the rolling elements is known as a kind of screw device (refer to Patent Literature 1). In the screw device, a communicating hole penetrating the nut in the axial direction is opened in the nut. A recess communicating with the communicating hole and a helical loaded rolling element rolling groove is processed in the axial end surface of the nut. The circulation member includes a turn-around path. When the circulation member is fitted into the recess, the turn-around path of the circulation member links to the loaded rolling element rolling groove and the communicating hole of the nut to form a circulation path of the rolling elements. The circulation member is fitted into the recess of the nut, and then is firmly fixed therein with a bolt or C-shaped ring. The rolling element that has rolled to one end of the loaded rolling element rolling groove of the nut returns to the other end of the loaded rolling element rolling groove via the turn-around path of the circulation member, the communicating hole, and a turn-around path of a circulation member on the opposite side.

CITATION LIST

Patent Literature

Patent Literature 1: JP 2007-247778 A

SUMMARY OF INVENTION

Technical Problem

In the known screw device, the recess in the end surface of the nut is processed by a milling cutter or the like from the end surface side of the nut after the helical loaded rolling element rolling groove is processed on the nut. However, upon processing the recess on the end surface of the nut, there is a problem that it is difficult to accurately align the position of the loaded rolling element rolling groove and the position of the recess. For example, if the recess is displaced from a right position in the circumferential direction of the nut, a connection portion of the loaded rolling element rolling groove and the recess is displaced in the axial direction of the nut since the loaded rolling element rolling groove has a lead. Consequently, even if the circulation member is fitted into the recess, the loaded rolling element rolling groove cannot be smoothly linked to the communicating hole through the turn-around path of the circulation member. The smooth circulation of the rolling elements is inhibited. The same applies to a case where the depth of the recess deviates from a right depth. In order to avoid it, it is necessary to process the recess with high accuracy.

Hence, the present invention provides a screw device that can provide an allowance for the accuracy of a recess in an end surface of a nut.

Solution to Problem

In order to solve the above problem, an aspect of the present invention is a rolling element screw device including: a screw shaft having a helical rolling element rolling groove in an outer peripheral surface thereof; a nut having a through-hole in which the screw shaft is rotatably placed, and a helical loaded rolling element rolling groove in an inner peripheral surface thereof, the helical loaded rolling element rolling groove facing the rolling element rolling groove; and a plurality of rolling elements placed between the rolling element rolling groove of the screw shaft and the loaded rolling element rolling groove of the nut in a manner capable of rolling motion, the nut having a communicating hole penetrating the nut in an axial direction, and a recess in an axial end surface, the recess communicating with the communicating hole and the loaded rolling element rolling groove, the recess of the nut accommodating a circulation member having a turn-around path linking to the loaded rolling element rolling groove and the communicating hole of the nut, the screw device comprising a clearance between the circulation member and a wall surface of the recess in such a manner as that the circulation member is movable, wherein the circulation member accommodated in the recess is covered with a lid member to be attached to the nut.

Advantageous Effects of Invention

According to the present invention, the circulation member becomes movable in the recess. Even if the recess is displaced from the loaded rolling element rolling groove of the nut, the position of the circulation member is determined on the basis of the movements of the rolling elements. Accordingly, the rolling elements can be smoothly circulated. Hence, an allowance for the accuracy of the recess can be provided.

BRIEF DESCRIPTION OF DRAWINGS

FIG. 3A is a front view of an end surface of the nut of the embodiment (a state where a circulation member is placed in a recess of the nut), and FIG. 3B is a front view of the end surface of the nut of the embodiment (a state where the circulation member has been removed).

DESCRIPTION OF EMBODIMENTS

Figure 1:
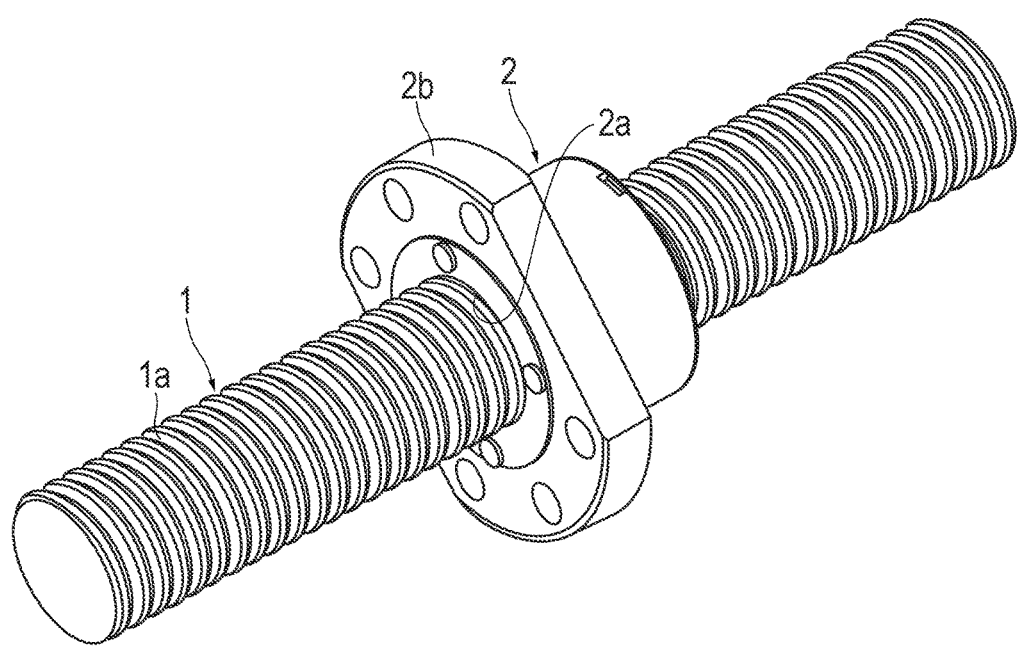
FIG. 1 is a perspective view of a screw device of a first embodiment of the present invention.
Figure 2:
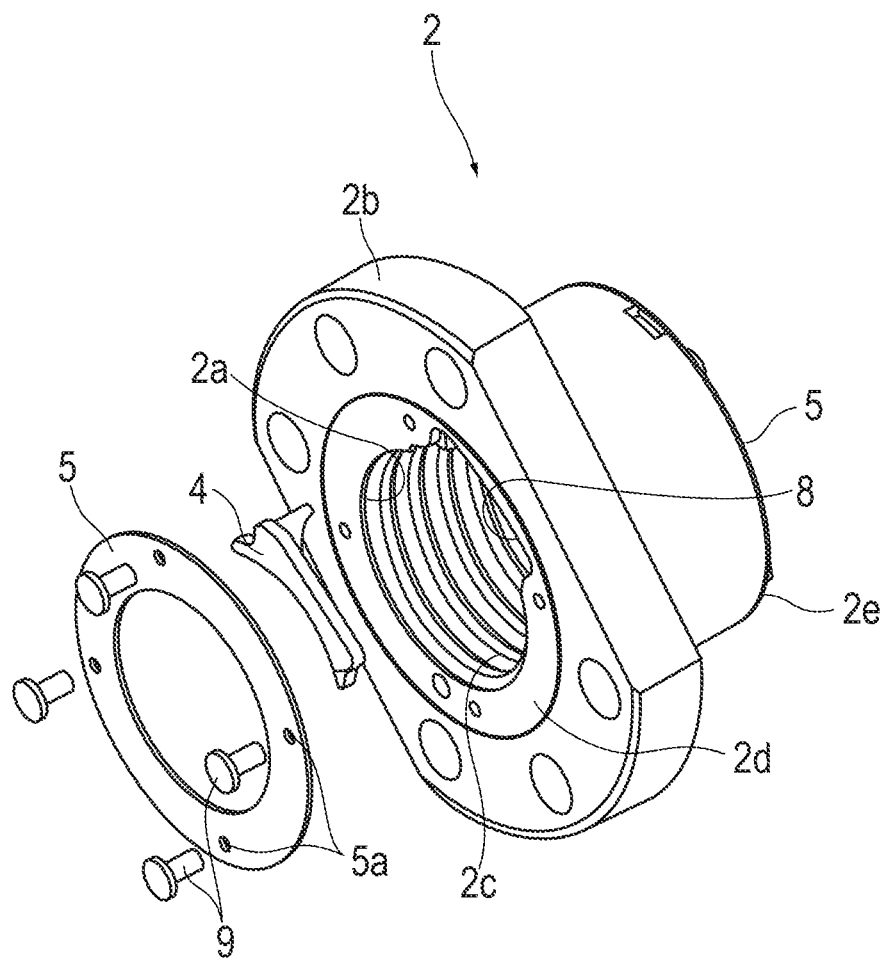
FIG. 2 is an exploded perspective view of a nut of the screw device of the embodiment.

A screw device of a first embodiment of the present invention is described hereinafter with reference to the accompanying drawings. FIG. 1 is a perspective view of the screw device. FIG. 2 is an exploded perspective view of a nut 2 of the screw device. The same reference numerals are assigned to the same configurations throughout the accompanying drawings and the following description.

First Embodiment

As illustrated in FIGS. 1 and 2, the screw device of the embodiment includes a nut 2, a screw shaft 1 rotatably provided inside the nut 2, a plurality of balls 3 as rolling elements (refer to FIG. 9), a circulation member 4 placed in an axial end surface 2d of the nut 2, and a seal cap 5 as a lid member attached to the axial end surface 2d of the nut 2.

As illustrated in FIG. 1, the nut 2 is cylindrical, and is provided in the center with a through-hole 2a penetrating in the axial direction. The screw shaft 1 penetrates the through-hole 2a. A flange 2b is provided at an axial end of the nut 2. The flange 2b is provided with a through-hole, through which a bolt passes, for attaching the nut 2 to a counter component.

As illustrated in FIG. 2, a helical loaded rolling element rolling groove 2c is formed in the inner peripheral surface of the nut 2. The loaded rolling element rolling groove 2c faces a helical rolling element rolling groove 1a (refer to FIG. 1) in the outer peripheral surface of the screw shaft 1. The plurality of balls 3 (refer to FIG. 9) is placed between the loaded rolling element rolling groove 2c of the nut 2 and the rolling element rolling groove 1a of the screw shaft 1 in a manner capable of rolling motion.

A recess 8 communicating with one end of the loaded rolling element rolling groove 2c is formed in the axial end surface 2d of the nut 2. The recess 8 is formed in each of the axial end surface 2d and an axial end surface 2e of the nut 2. FIG. 2 illustrates only the recess 8 in the front end surface 2d of the nut 2. However, a recess with the same structure is also formed in the rear end surface 2e of the nut 2.

FIG. 3B illustrates the end surface 2d of the nut 2 when viewed from the axial direction. FIG. 3A illustrates the end surface 2d of the nut 2 where the circulation member 4 is placed in the recess 8. An X-axis of FIG. 3B is a direction in which the ball 3 that has left a communicating hole 7 moves toward the loaded rolling element rolling groove 2c, and is a tangent direction of the loaded rolling element rolling groove 2c. A Y-axis is a direction orthogonal to the X-axis. A Z-axis is an axis orthogonal to the paper surface, and is the axial direction of the screw shaft 1.

As illustrated in FIG. 3B, the through-hole 2a is formed in the center of the nut 2. The loaded rolling element rolling groove 2c is formed in the inner peripheral surface of the nut 2. The communicating hole 7 penetrating the nut 2 in the axial direction is provided on the side of the through-hole 2a of the nut 2. The end surface 2d of the nut 2 is provided with the recess 8 communicating with the communicating hole 7 and the loaded rolling element rolling groove 2c. The recess 8 includes an insertion portion-specific recess 11 that is deep in the Z-axis direction, where a turn-around path is formed, and an overhang portion-specific recess 12 that is shallower in the Z-axis direction than the insertion portion-specific recess 11 (the bottom surface of the overhang portion-specific recess 12 is indicated by dots). The insertion portion-specific recess 11 forms the turn-around path in cooperation with the circulation member 4. The turn-around path includes a linear portion P1 placed in the tangent direction of the loaded rolling element rolling groove 2c, and an arc portion P2 linking the linear portion P1 and the communicating hole 7 with a central angle of approximately 90 degrees (refer also to FIG. 9).

Figure 4A:
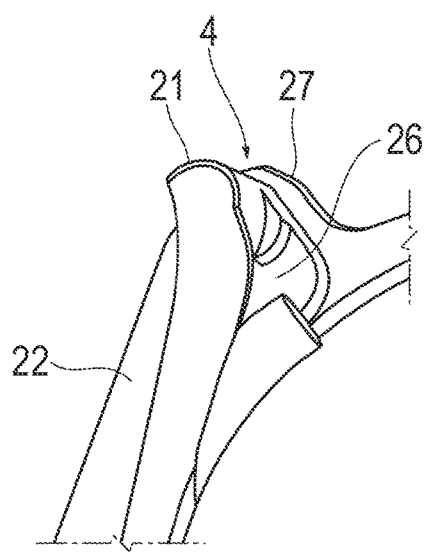
FIG. 4A is a perspective view of the circulation member of the embodiment.
Figure 4B:
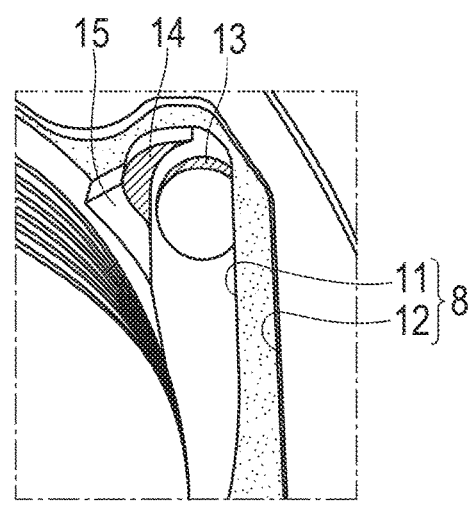
FIG. 4B is a perspective view of the recess of the nut of the embodiment.

FIG. 4A illustrates a perspective view of the circulation member 4. FIG. 4B illustrates a perspective view of the recess 8. Also in FIG. 4B, the bottom surface of the overhang portion-specific recess 12 is indicated by dots. The circulation member 4 includes an insertion portion 21 to be inserted into the insertion portion-specific recess 11, and an overhang portion 22 that overhangs outward of the insertion portion 21 and is placed in the overhang portion-specific recess 12. The inner peripheral side of the arc portion P2 of the turn-around path is formed by the insertion portion-specific recess 11. The outer peripheral side of the arc portion P2 of the turn-around path is formed by the insertion portion 21 of the circulation member 4. The linear portion P1 of the turn-around path is divided in an X-Y plane illustrated in FIG. 3B. One of the divided linear portions P1 is formed by the insertion portion-specific recess 11. The other divided linear portion P1 is formed by the overhang portion 22 of the circulation member 4. An arc-shaped step portion 13 (indicated by oblique lines; refer also to FIG. 3B) where a distal end of the insertion portion 21 of the circulation member 4 is placed is formed in the insertion portion-specific recess 11. The recess 8 further includes an arc-shaped movement restriction recess 14 (indicated by oblique lines; refer also to FIG. 3B) that is adjacent to the communicating hole 7, and a rib-specific recess 15 (refer also to FIG. 3B). The movement restriction recess 14 is deeper in the Z-axis direction than the rib-specific recess 15.

As illustrated in FIG. 3B, one circumferential end 12a of the overhang portion-specific recess 12 of the recess 8 opens out to the through-hole 2a. As illustrated in FIG. 3A, it is configured in such a manner that the circulation member 4 placed in the recess 8 is rotatable about the insertion portion 21 in a clockwise direction CW. As illustrated in FIG. 3B, the other circumferential end 12b of the overhang portion-specific recess 12 also opens out to the through-hole 2a. As illustrated in FIG. 3A, it is configured in such a manner that the circulation member 4 placed in the recess 8 is rotatable about the insertion portion 21 in a counterclockwise direction CCW.

As illustrated in FIG. 3A, the circulation member 4 is placed in the recess 8. A clearance g1 is provided between the circulation member 4 and a wall surface of the recess 8 in such a manner that the circulation member 4 is movable in the recess 8. As described above, the circulation member 4 includes the insertion portion 21 and the overhang portion 22. As illustrated in FIGS. 4A and 4B, a clearance is provided between the insertion portion 21 of the circulation member 4 and a wall surface (refer to a hatched portion 11c of FIG. 5B) of the insertion portion-specific recess 11, and is also provided between the overhang portion 22 of the circulation member 4 and a wall surface (refer to a hatched portion 12c of FIG. 5B) of the overhang portion-specific recess 12, in such a manner as that the circulation member 4 is movable. The size of the clearance g1 is not especially limited, and is, for example, 50 μm to 100 μm.

Figure 5A:
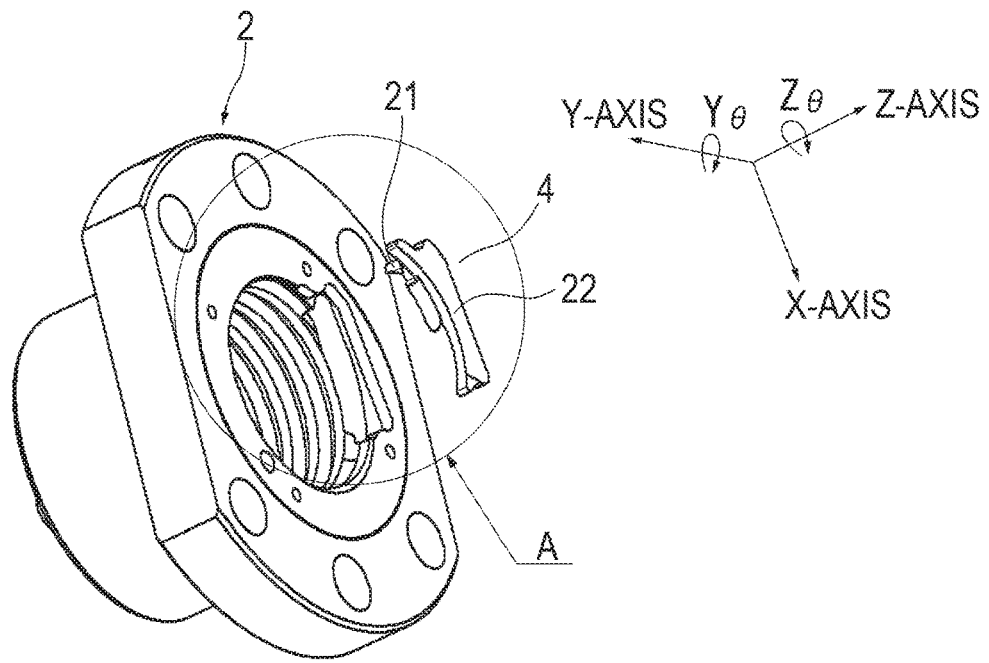
FIG. 5A illustrates a perspective view of the nut and the circulation member of the embodiment.
Figure 5B:
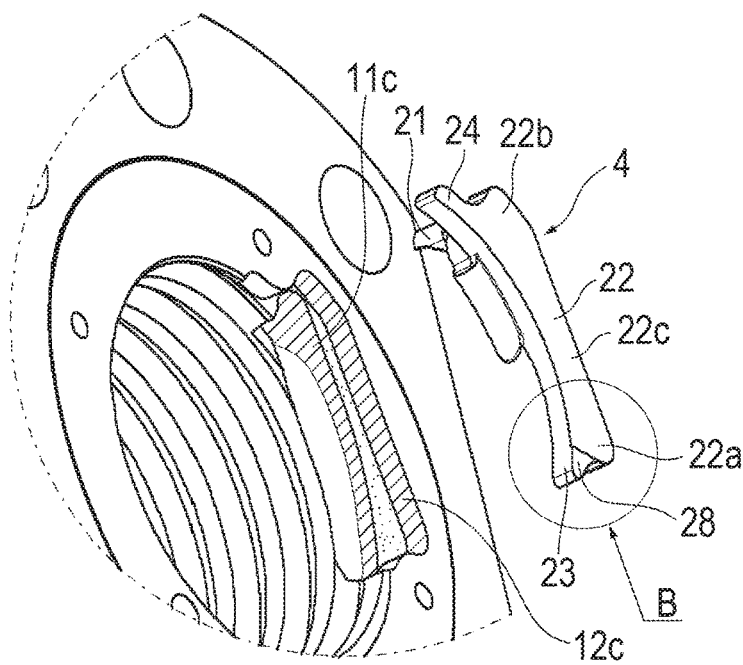
FIG. 5B illustrates an enlarged view of part A of FIG. 5A.
Figure 6:
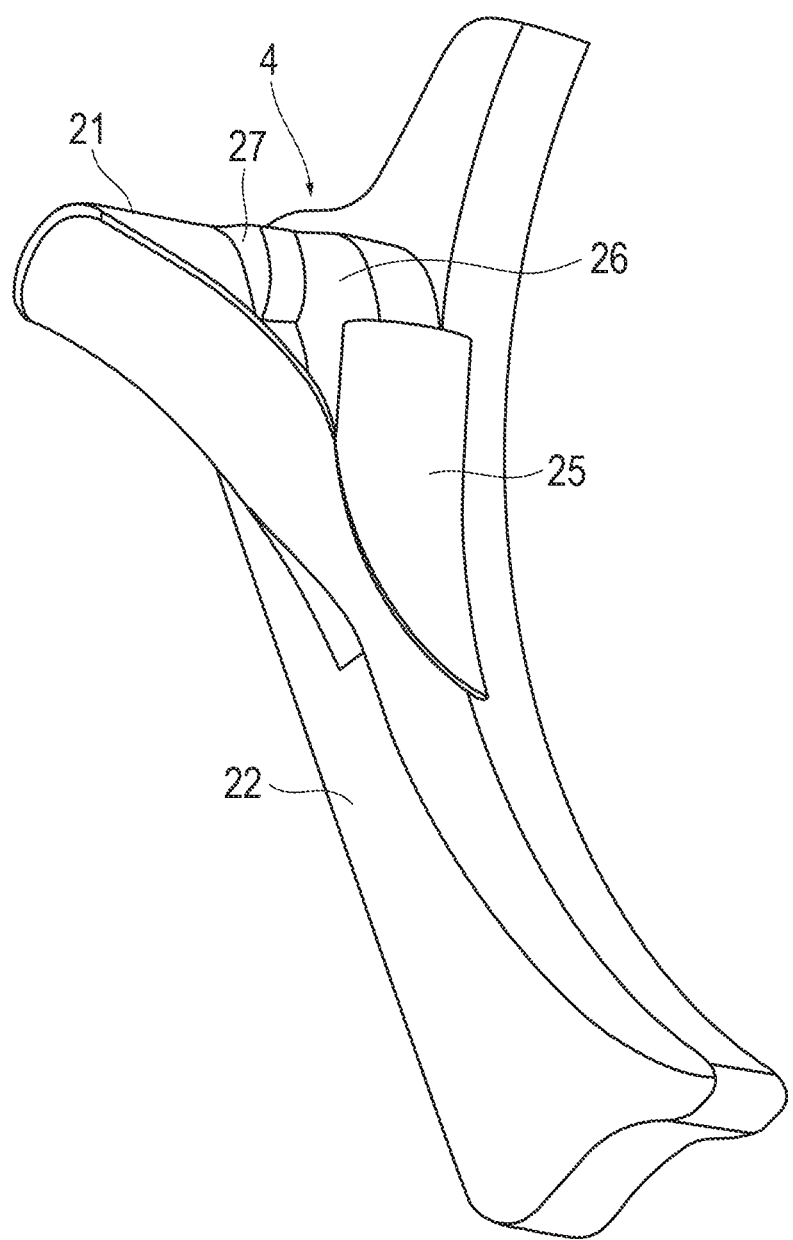
FIG. 6 is a perspective view of the circulation member of the embodiment.

FIG. 5A illustrates a perspective view of the nut 2 and the circulation member 4. FIG. 5B illustrates an enlarged view of part A of FIG. 5A. FIG. 6 illustrates a perspective view of the circulation member 4 when viewed from the insertion portion 21 side. As illustrated in FIG. 5 A, the overhang portion 22 of the circulation member 4 is formed into a plate shape that curves along the through-hole 2a. As illustrated in FIG. 5B, the overhang portion 22 includes a first leg portion 23 protruding in the circumferential direction at the inner peripheral side of one circumferential end 22a. Moreover, the overhang portion 22 includes a second leg portion 24 protruding in the circumferential direction at the inner peripheral side of the other circumferential end 22b. As illustrated in FIG. 3 A, an inner periphery 22d, the first leg portion 23, and the second leg portion 24 of the overhang portion 22 protrude radially inward of the through-hole 2a of the nut 2.

As illustrated in FIG. 6, the insertion portion 21 of the circulation member 4 protrudes from the overhang portion 22 toward the nut 2. The insertion portion 21 forms the outer peripheral side of the arc portion P2 of the turn-around path. A cross section orthogonal to the turn-around path of the insertion portion 21 is of an arc shape. The circulation member 4 is further provided with a substantially columnar scooping portion 25, a rib 26 for reinforcing the scooping portion 25, and a movement restriction protrusion 27. The scooping portion 25 is curved along the rolling element rolling groove 1a of the screw shaft 1, and has the function of scooping the balls 3 that move along the rolling element rolling groove 1a of the screw shaft 1. The rib 26 is connected to the scooping portion 25 to reinforce the scooping portion 25. The movement restriction protrusion 27 is of an arc shape and is adjacent to the insertion portion 21. There is a step between the movement restriction protrusion 27 and the rib 26. The movement restriction protrusion 27 protrudes toward the nut 2 with respect to the rib 26. As illustrated in FIGS. 4 A and 4B, when the circulation member 4 is placed in the recess 8, the movement restriction protrusion 27 is placed in the movement restriction recess 14. The rib 26 is placed in the rib-specific recess 15.

Figure 7:
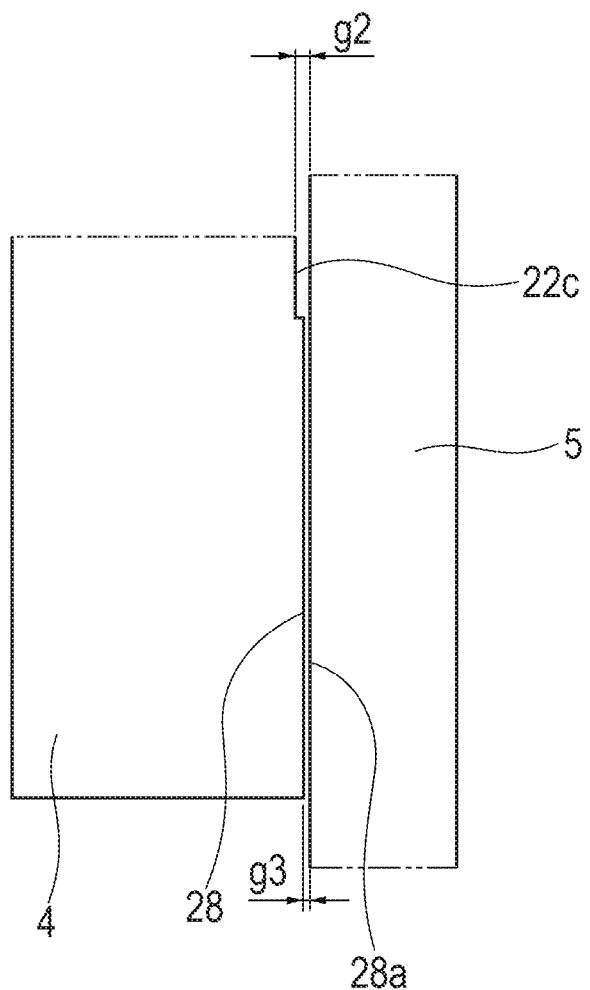
FIG. 7 is an enlarged view of part B of FIG. 5B, and is a side view of a projection of the circulation member of the embodiment.

As illustrated in FIG. 5B, the overhang portion 22 of the circulation member 4 is formed in such a manner that an opposing surface 22c (an end surface in the Z-axis direction) to the seal cap 5 is flat. A projection 28 protruding from the opposing surface 22c toward the seal cap 5 is formed at the one end 22a, which is away from the communicating hole 7, on the opposing surface 22c of the circulation member 4. As illustrated in a side view of the circulation member 4 of FIG. 7 in which the projection 28 has been enlarged, a surface 28a of the projection 28 is formed in such a manner as to be flat. A clearance g3 is formed between the surface 28a of the projection 28 and the seal cap 5. The size of the clearance g3 is not especially limited, and is, for example, 20 μm to 40 μm. A clearance g2 is provided between the opposing surface 22c of the circulation member 4 and the seal cap 5. The clearance g2 is larger than the clearance g3. The size of the clearance g2 is not especially limited, and is, for example, 50 μm to 150 μm. The circulation member 4 is made of resin.

As illustrated in FIG. 2, the circulation member 4 is placed in the recess 8 and then covered with the seal cap 5. The seal cap 5 is formed into a thin ring shape. The seal cap 5 includes a plurality of through-holes 5a through each of which a bolt 9 as a fastening member passes. The seal cap 5 is firmly fixed by the bolts 9 to the end surface 2d of the nut 2. The seal cap 5 is made of resin. When the circulation member 4 is placed in the recess 8 of the nut 2, the loaded rolling element rolling groove 2c of the nut 2 and the turn-around path of the circulation member 4 are linked and the communicating hole 7 of the nut 2 and the turn-around path of the circulation member 4 are linked.

There is the clearance g1 between the circulation member 4 and the wall surface of the recess 8. The circulation member 4 is movable in the recess 8. Even if the recess 8 is displaced from the loaded rolling element rolling groove 2c of the nut 2, the balls 3 can be smoothly circulated. Accordingly, an allowance for the accuracy of the recess 8 can be provided.

Moreover, the circulation member 4 includes the insertion portion 21 and the overhang portion 22. When the balls 3 are circulated, as illustrated in FIG. 3 A, the circulation member 4 oscillates about the Z-axis at the insertion portion 21 in the clockwise direction CW and the counterclockwise direction CCW. The circulation member 4 oscillates about the Z-axis; accordingly, even if the loaded rolling element rolling groove 2c and the circulation member 4 are displaced from each other, the position of the circulation member 4 is determined on the basis of the movements of the balls 3. The balls 3 move smoothly through a connection portion of the loaded rolling element rolling groove 2c and the turn-around path.

The circulation member 4 and the recess 8 of the embodiment have the function of restricting the movement of the circulation member 4 to less than a predetermined amount while securing the movement of the circulation member 4. The function of restricting the movement is described below with reference to FIGS. 5A and 5B, and 8A to 8C to 10. A Z-axis of FIG. 5 A is the axial direction of the screw shaft 1. An X-axis is a direction in which the ball 3 that has left the communicating hole 7 moves toward the loaded rolling element rolling groove 2c. A Y-axis is a direction orthogonal to the Z-axis and the X-axis. In the embodiment, it is configured in such a manner that the circulation member 4 is movable in the X-, Y-, and Z-axis directions, Zθ being the rotation of the circulation member 4 about the Z-axis is restricted, Yθ being the rotation of the circulation member 4 about the Y-axis is restricted, and the movement of the circulation member 4 in the X-axis direction is restricted.

Figure 8:
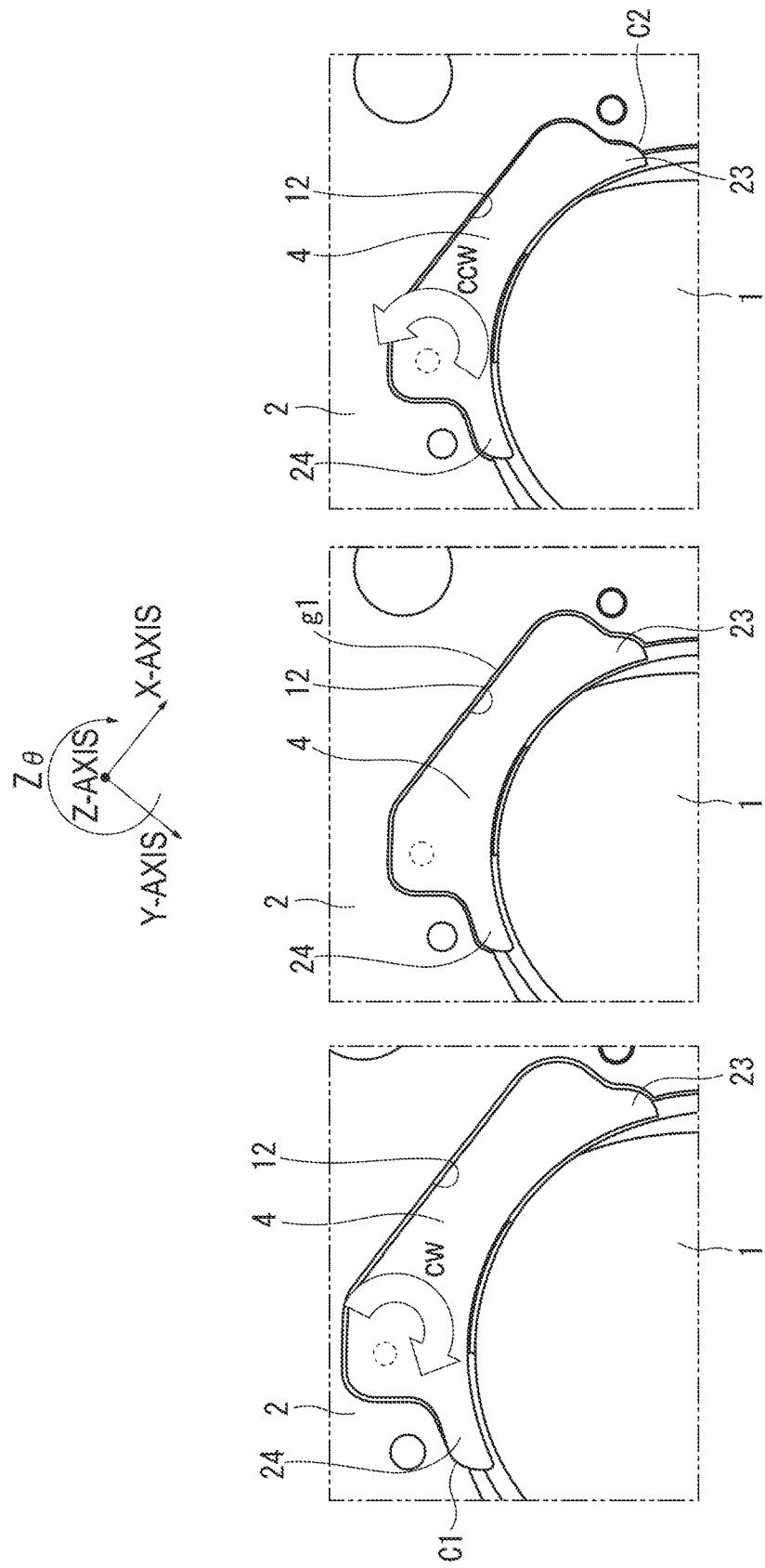
FIG. 8A is the circulation member of the embodiment when viewed from the axial direction of a screw shaft (when the circulation member has rotated in a clockwise direction)
FIG. 8B is also the circulation member of the embodiment (when the circulation member is at the center position)
FIG. 8C is also the circulation member of the embodiment (when the circulation member has rotated in a counterclockwise direction).

Zθ of the circulation member 4 is restricted as follows: FIGS. 8A to 8C illustrate the circulation member 4 when viewed from the axial direction of the screw shaft 1. FIG. 8B illustrates the time when the circulation member 4 is at the center position. FIG. 8 A illustrates the time when the circulation member 4 has rotated about the insertion portion 21 in the clockwise direction CW. FIG. 8C illustrates the time when the circulation member 4 has rotated about the insertion portion 21 in the counterclockwise direction CCW. As illustrated in FIG. 8A, the second leg portion 24 of the circulation member 4 is configured in such a manner as to come into contact with one wall surface C1 of the overhang portion-specific recess 12 of the recess 8 before the first leg portion 23 of the circulation member 4 that rotates in the clockwise direction CW comes into contact with the screw shaft 1. In addition, as illustrated in FIG. 8C, the first leg portion 23 of the circulation member 4 is configured in such a manner as to come into contact with the other wall surface C2 of the overhang portion-specific recess 12 of the recess 8 before the second leg portion 24 of the circulation member 4 that rotates in the counterclockwise direction CCW comes into contact with the screw shaft 1. Consequently, the interference between the circulation member 4 that oscillates about the insertion portion 21 and the screw shaft 1 can be avoided. Moreover, the first and second leg portions 23 and 24 are placed at the circumferential ends of the circulation member 4; accordingly, the angle of oscillation of the circulation member 4 can be controlled with high accuracy.

Figure 9:
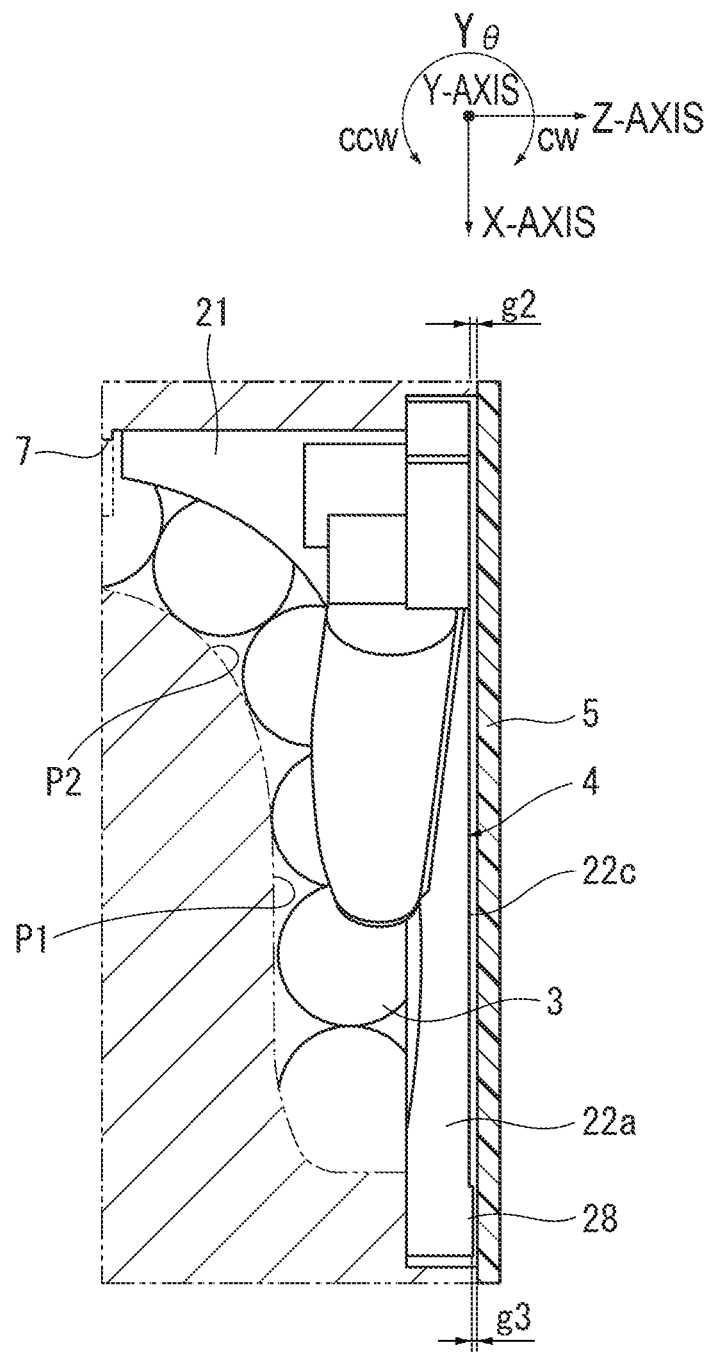
FIG. 9 is a side view of the circulation member (the circulation member when placed in the recess) of the embodiment.

Yθ of the circulation member 4 is restricted as follows: FIG. 9 illustrates the circulation member 4 when viewed from the Y-axis direction of FIG. 5 A. If the circulation member 4 is inclined about the Y-axis in the counterclockwise direction CCW, the distal end of the insertion portion 21 of the circulation member 4 protrudes into the communicating hole 7, and accordingly, may come into contact with the ball 3 that has left the communicating hole 7. The circulation member 4 is provided at the one end 22a, which is away from the communicating hole 7, with the projection 28 that comes into contact with the seal cap 5; accordingly, the inclination of the circulation member 4 about the Y-axis in the counterclockwise direction CCW can be restricted. The clearance g3 is provided between the projection 28 and the seal cap 5. Accordingly, the circulation member 4 can move a distance equal to the clearance g3 in the Z-axis direction.

On the other hand, the clearance g2 is provided between the opposing surface 22c of the circulation member 4 and the seal cap 5. Consequently, the circulation member 4 can be inclined in the clockwise direction CW, pivoting on the projection 28. When the balls 3 are circulated, the circulation member 4 oscillates about the Y-axis of FIG. 9. Accordingly, the balls 3 move smoothly through the connection portion of the communicating hole 7 and the turn-around path.

Figure 10:
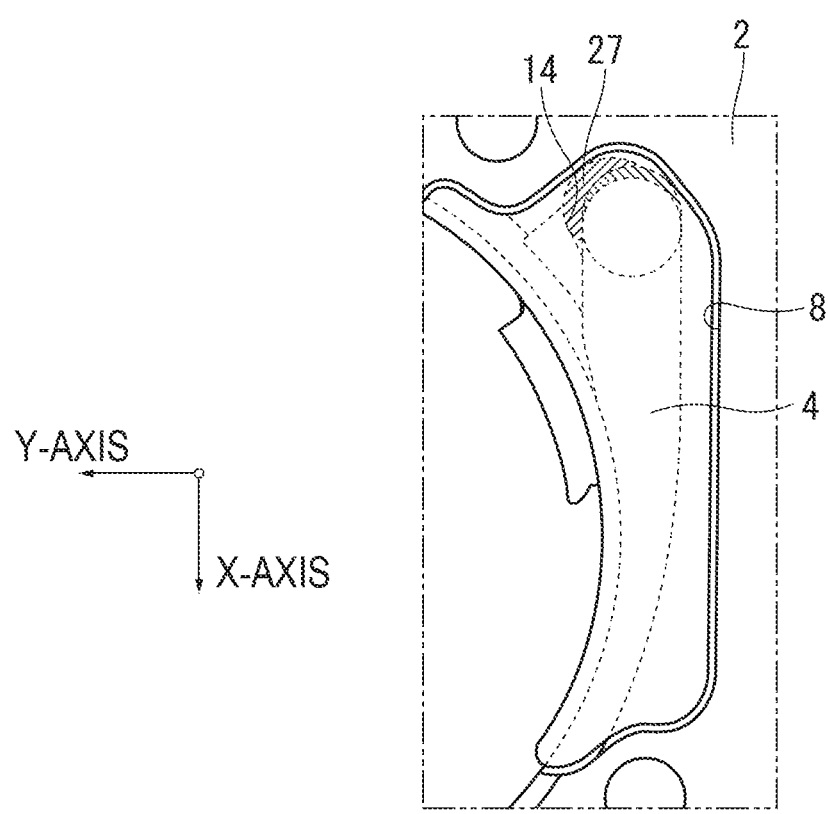
FIG. 10 is a front view of the circulation member of the embodiment when viewed from the axial direction.

The X-axis movement of the circulation member 4 is restricted as follows: As illustrated in FIG. 9, if the circulation member 4 moves in the X-axis direction, the distal end of the insertion portion 21 of the circulation member 4 protrudes into the communicating hole 7. Accordingly, the same phenomenon as the time when the circulation member 4 rotates about the Y-axis in the counterclockwise direction CCW occurs. In order to avoid this, the circulation member 4 is provided with the movement restriction protrusion 27 as illustrated in FIG. 4A, and the recess 8 is provided with the movement restriction recess 14 as illustrated in FIG. 4B. As illustrated in FIG. 10, when the circulation member 4 moves in the X-axis direction (the down direction of FIG. 9), the movement restriction protrusion 27 (indicated by oblique lines) and the movement restriction recess 14 come into contact with each other to restrict the movement of the circulation member 4 in the X-axis direction. The movement restriction recess 14 is placed adjacently to the communicating hole 7 to enable the placement of the movement restriction protrusion 27 inside the circulation member 4 as illustrated in FIG. 10. Therefore, the space in the recess 8 can be effectively used.

Second Embodiment

Figure 11:
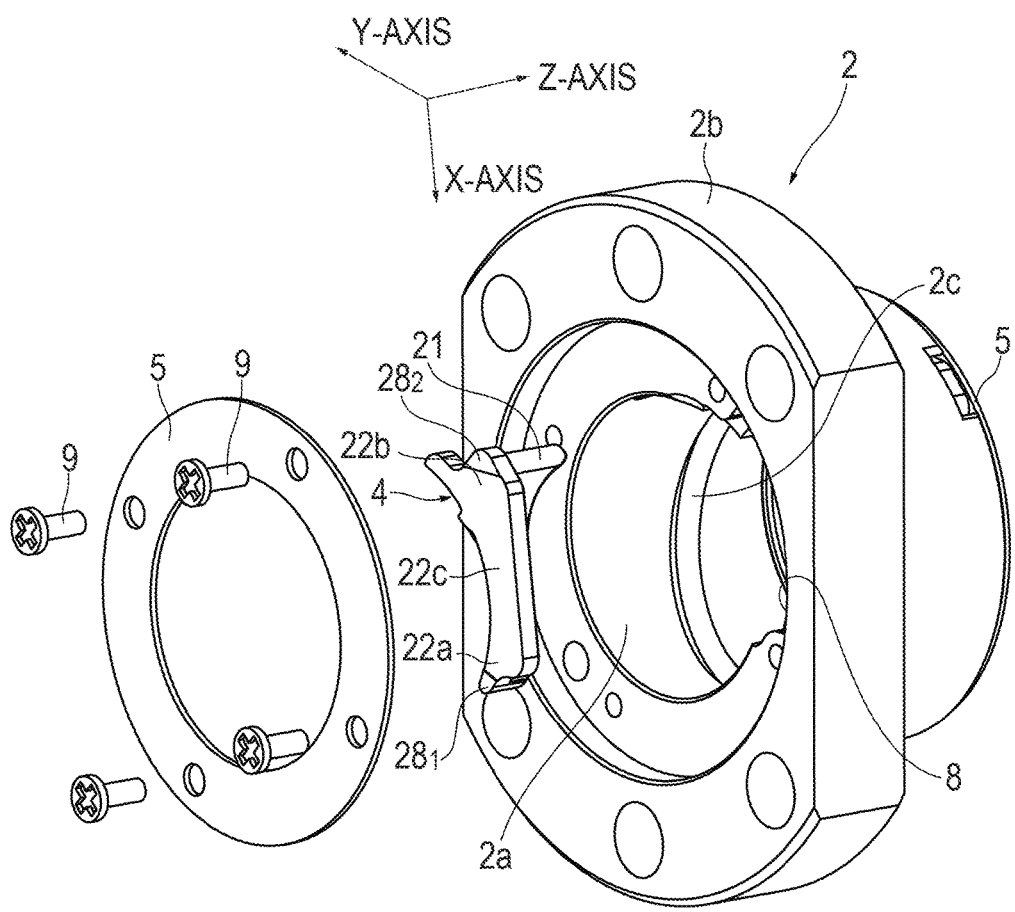
FIG. 11 is an exploded perspective view of a nut of a screw device of a second embodiment of the present invention.

FIG. 11 illustrates an exploded perspective view of a nut of a screw device of a second embodiment of the present invention. The screw device of the second embodiment also includes a screw shaft 1, a nut 2, a circulation member 4 placed in a recess 8 of the nut 2, and a seal cap 5 that covers the circulation member 4. The configurations of the screw shaft 1, the nut 2, the recess 8 of the nut 2, and the seal cap 5 are the same as those of the screw device of the first embodiment. Accordingly, the same reference numerals are assigned to omit their descriptions.

In the first embodiment, one projection 28 is provided to the opposing surface 22c, which faces the seal cap 5, of the circulation member 4 as illustrated in FIG. 5B. However, in the second embodiment, two projections $28_1$ and $28_2$ are provided to the opposing surface 22c, which faces the seal cap 5, of the circulation member 4 as illustrated in FIG. 11. The first projection $28_1$ is provided at the one circumferential end 22a, which is away from the communicating hole 7 (FIG. 11 illustrates the insertion portion 21 that is inserted into the insertion hole 7), and protrudes from the opposing surface 22c toward the seal cap 5. The second projection $28_2$ is provided at the other circumferential end 22b, which is close to the communicating hole 7, and protrudes from the opposing surface 22c toward the seal cap 5. The other configurations of the circulation member 4 are the same as those of the circulation member 4 of the first embodiment. Accordingly, the same reference numerals are assigned to omit their descriptions.

Figure 12:
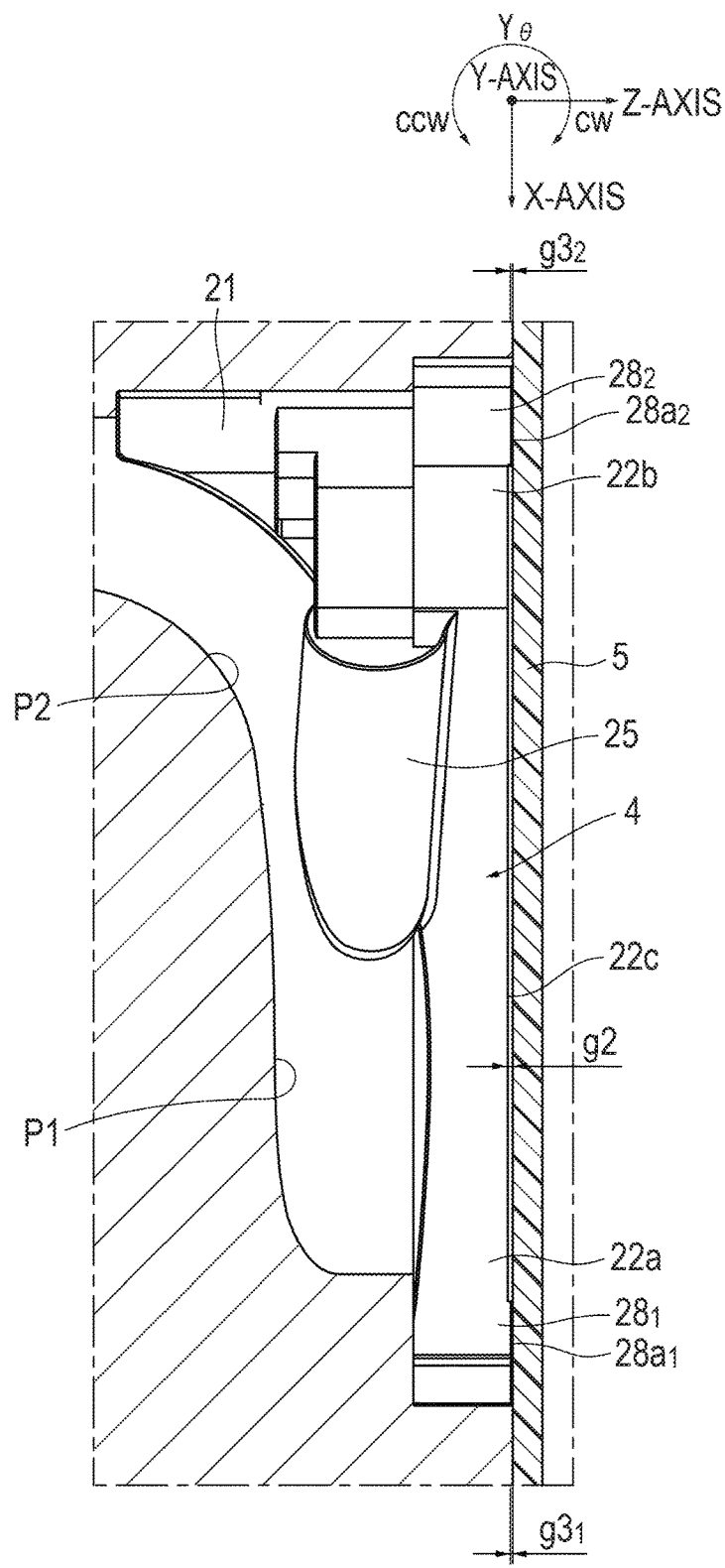
FIG. 12 is a side view of a circulation member (a circulation member when accommodated in the recess) of the screw device of the second embodiment of the present invention.

As illustrated in FIG. 12, a surface $28a_1$ of the first projection $28_1$ is formed in such a manner as to be flat. A clearance $g3_1$ is provided between the surface $28a_1$ and the seal cap 5. The size of the clearance $g3_1$ is not especially limited, and is, for example, 20 μm to 40 μm. A surface $28a_2$ of the second projection $28_2$ is also formed in such a manner as to be flat. A clearance $g3_2$ is provided between the surface $28a_2$ and the seal cap 5. The size of the clearance $g3_2$ is not especially limited, and is, for example, 20 μm to 40 μm. The clearance g2 between the opposing surface 22c and the seal cap 5 is, for example, 50 μm to 150 μm as in the circulation member 4 of the first embodiment.

As a result of a demonstration experiment, the life of the circulation member 4 could be extended by providing the first and second projections $28_1$ and $28_2$ to the circulation member 4.

The screw device of the present invention can be embodied in various forms, and is not limited to the embodiments described in the present description. The embodiments are provided with the intention of encouraging a person skilled in the art to fully understand the scope of the invention by fully disclosing the description.

The shapes of the recesses and the circulation member of the embodiments are examples. Other shapes can be adopted within the scope that does not change the gist of the present invention. In the embodiments, the seal cap is fixed by the bolts to the nut, but can also be fixed by a C-ring. In the embodiments, the axial end surface of the nut is caused to slightly protrude from the end surface of the flange. However, the axial end surface of the nut can also be recessed from the end surface of the flange. A roller, instead of the balls, can be used as the rolling element.

The present description is based on Japanese Patent Application No. 2015-014001 filed on Jan. 28, 2015 and Japanese Patent Application No. 2016-012901 filed on Jan. 27, 2016, the entire contents of which are incorporated herein.

REFERENCE SIGNS LIST

1 Screw shaft
1a Rolling element rolling groove

2 Nut
2a Through-hole
2b Flange
2c Loaded rolling element rolling groove
2d, 2e End surface of the nut
3 Ball (rolling element)
4 Circulation member
5 Seal cap (lid member)
7 Communicating hole
8 Recess
11 Insertion portion-specific recess
12 Overhang portion-specific recess
12a One end of the overhang portion-specific recess
12b The other end of the overhang portion-specific recess
14 Movement restriction recess
21 Insertion portion
22 Overhang portion
22a One end of the circulation member
22b The other end of the circulation member
22c Opposing surface of the circulation member
23 First leg portion
24 Second leg portion
25 Scooping portion
26 Rib
27 Movement restriction protrusion
28 Projection
$28_1$ First projection
$28_2$ Second projection
28a Surface of the projection
$28a_1$ Surface of the first projection
$28a_2$ Surface of the second projection
g1 Clearance
g2 Clearance
g3 Clearance
$g3_1$ Clearance
$g3_2$ Clearance

The invention claimed is:

1. A rolling element screw device including: a screw shaft having a helical rolling element rolling groove in an outer peripheral surface thereof; a nut having a through-hole in which the screw shaft is rotatably placed, and a helical loaded rolling element rolling groove in an inner peripheral surface thereof, the helical loaded rolling element rolling groove facing the rolling element rolling groove; and a plurality of rolling elements placed between the rolling element rolling groove of the screw shaft and the loaded rolling element rolling groove of the nut in a manner capable of rolling motion, the nut having a communicating hole penetrating the nut in an axial direction, and a recess in an axial end surface, the recess communicating with the communicating hole and the loaded rolling element rolling groove, the recess of the nut accommodating a circulation member having a turn-around path linking to the loaded rolling element rolling groove and the communicating hole of the nut, the screw device comprising
  a clearance between the circulation member and a wall surface of the recess in such a manner as that the circulation member is movable, wherein
  the circulation member accommodated in the recess is covered with a lid member to be attached to the nut, the lid member being a separate body from the circulation member,
  the circulation member includes
    an insertion portion having the turn-around path, and
    an overhang portion overhanging outward of the insertion portion, and
  the recess includes
    an insertion portion-specific recess into which the insertion portion of the circulation member is inserted, and
    an overhang portion-specific recess in which the overhang portion of the circulation member is accommodated.

2. The screw device according to claim 1, wherein
one circumferential end of the overhang portion-specific recess opens out to the through-hole in such a manner as that the circulation member is rotatable about the insertion portion in one direction,
the other circumferential end of the overhang portion-specific recess opens out to the through-hole in such a manner as that the circulation member is rotatable about the insertion portion in the other direction, and
the circulation member includes
  at the one circumferential end, a first leg portion that comes into contact with a wall surface of the overhang portion-specific recess before the circulation member that rotates in the other direction comes into contact with the screw shaft, and
  at the other circumferential end, a second leg portion that comes into contact with a wall surface of the overhang portion-specific recess before the circulation member that rotates in the one direction comes into contact with the screw shaft.

3. A rolling element screw device including: a screw shaft having a helical rolling element rolling groove in an outer peripheral surface thereof; a nut having a through-hole in which the screw shaft is rotatably placed, and a helical loaded rolling element rolling groove in an inner peripheral surface thereof, the helical loaded rolling element rolling groove facing the rolling element rolling groove; and a plurality of rolling elements placed between the rolling element rolling groove of the screw shaft and the loaded rolling element rolling groove of the nut in a manner capable of rolling motion, the nut having a communicating hole penetrating the nut in an axial direction, and a recess in an axial end surface, the recess communicating with the communicating hole and the loaded rolling element rolling groove, the recess of the nut accommodating a circulation member having a turn-around path linking to the loaded rolling element rolling groove and the communicating hole of the nut, the screw device comprising
  a clearance between the circulation member and a wall surface of the recess in such a manner as that the circulation member is movable, wherein
  the circulation member accommodated in the recess is covered with a lid member to be attached to the nuts the lid member being a separate body from the circulation member,
    the circulation member includes, at one end away from the communicating hole, a projection protruding from an opposing surface facing the lid member toward the lid member, and
  a clearance is provided between the opposing surface of the circulation member and the lid member.

4. A rolling element screw device including: a screw shaft having a helical rolling element rolling groove in an outer peripheral surface thereof; a nut having a through-hole in which the screw shaft is rotatably placed, and a helical loaded rolling element rolling groove in an inner peripheral surface thereof, the helical loaded rolling element rolling groove facing the rolling element rolling groove; and a plurality of rolling elements placed between the rolling element rolling groove of the screw shaft and the loaded rolling element rolling groove of the nut in a manner capable of rolling motion, the nut having a communicating hole penetrating the nut in an axial direction, and a recess in an axial end surface, the recess communicating with the communicating hole and the loaded rolling element rolling groove, the recess of the nut accommodating a circulation member having a turn-around path linking to the loaded rolling element rolling groove and the communicating hole of the nut, the screw device comprising a clearance between the circulation member and a wall surface of the recess in such a manner as that the circulation member is movable, wherein the circulation member accommodated in the recess is covered with a lid member to be attached to the nut, the lid member being a separate body from the circulation member, the circulation member includes at one end away from the communicating hole, a first projection protruding from an opposing surface facing the lid member toward the lid member, and at the other end close to the communicating hole, a second projection protruding from the opposing surface facing the lid member toward the lid member, and a clearance is provided between the opposing surface of the circulation member and the lid member.

5. The screw device according to claim 3, wherein a clearance is provided between the projection and the lid member, or a clearance is provided between each of the first and second projections and the lid member.

6. A rolling element screw device including: a screw shaft having a helical rolling element rolling groove in an outer peripheral surface thereof; a nut having a through-hole in which the screw shaft is rotatably placed, and a helical loaded rolling element rolling groove in an inner peripheral surface thereof, the helical loaded rolling element rolling groove facing the rolling element rolling groove; and a plurality of rolling elements placed between the rolling element rolling groove of the screw shaft and the loaded rolling element rolling groove of the nut in a manner capable of rolling motion, the nut having a communicating hole penetrating the nut in an axial direction, and a recess in an axial end surface, the recess communicating with the communicating hole and the loaded rolling element rolling groove, the recess of the nut accommodating a circulation member having a turn-around path linking to the loaded rolling element rolling groove and the communicating hole of the nut, the screw device comprising a clearance between the circulation member and a wall surface of the recess in such a manner as that the circulation member is movable, wherein the circulation member accommodated in the recess is covered with a lid member to be attached to the nut, the lid member being a separate body from the circulation member, the recess includes a movement restriction recess adjacently to the communicating hole, the circulation member includes a movement restriction protrusion accommodated in the movement restriction recess, and when the nut is viewed from the axial direction, the movement restriction recess and the movement restriction protrusion come into contact with each other to restrict the movement of the circulation member in an X-axis direction in which the rolling element that has left the communicating hole moves toward the loaded rolling element rolling groove.

7. The screw device according to claim 4, wherein a clearance is provided between the projection and the lid member, or a clearance is provided between each of the first and second projections and the lid member.

* * * * *